(12) United States Patent
Fujinami

(10) Patent No.: US 6,718,119 B1
(45) Date of Patent: Apr. 6, 2004

(54) VIDEO/AUDIO DECODING APPARATUS AND METHOD

(75) Inventor: Yasushi Fujinami, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/369,916

(22) Filed: Aug. 6, 1999

(30) Foreign Application Priority Data

Aug. 10, 1995 (JP) .......................................... 10-226032

(51) Int. Cl.$^7$ ................................................ H04N 5/93
(52) U.S. Cl. ............................ 386/52; 386/98; 386/109
(58) Field of Search .............................. 386/46, 52, 55, 386/109, 112, 124, 98, 85, 89, 125–126, 96; 348/423.1, 515, 512; 375/240.28; H04N 5/93

(56) References Cited

U.S. PATENT DOCUMENTS

| | | | | |
|---|---|---|---|---|
| 5,481,543 A | * | 1/1996 | Veltman .................. | 348/423.1 |
| 5,617,145 A | * | 4/1997 | Huang et al. ............ | 348/423.1 |
| 5,652,627 A | * | 7/1997 | Allen ........................ | 348/497 |
| 6,130,987 A | * | 10/2000 | Tanaka ..................... | 386/96 |
| 6,148,135 A | * | 11/2000 | Suzuki ..................... | 348/423.1 |
| 6,212,208 B1 | * | 4/2001 | Yoneda et al. ........... | 348/423.1 |
| 6,393,574 B1 | * | 5/2002 | Kashiwagi et al. ...... | 713/400 |

* cited by examiner

Primary Examiner—Vincent Boccio
(74) Attorney, Agent, or Firm—Frommer Lawrence & Haug LLP; William S. Frommer; Dennis M. Smid

(57) ABSTRACT

In a system target decoder for seamlessly reproducing a stream obtained by conducting multiplexing so that an audio skew generated in a stream connection portion will not be separated from a video stream corresponding thereto, the capacity of the audio buffer to be increased is stipulated. The capacity is increased by at least $$T \times R_{Video} \times R_{Audio} \div (R_{Video} + R_{Audio})$$

where T is a sum of an interval during which an audio stream is inputted to the audio buffer, but a video stream is not inputted to a video buffer and an interval during which an audio stream is not inputted to the audio buffer, but a video stream is inputted to the video buffer, $R_{Video}$ is a readout rate of the video stream, and $R_{Audio}$ is a readout rate of the audio stream.

6 Claims, 7 Drawing Sheets

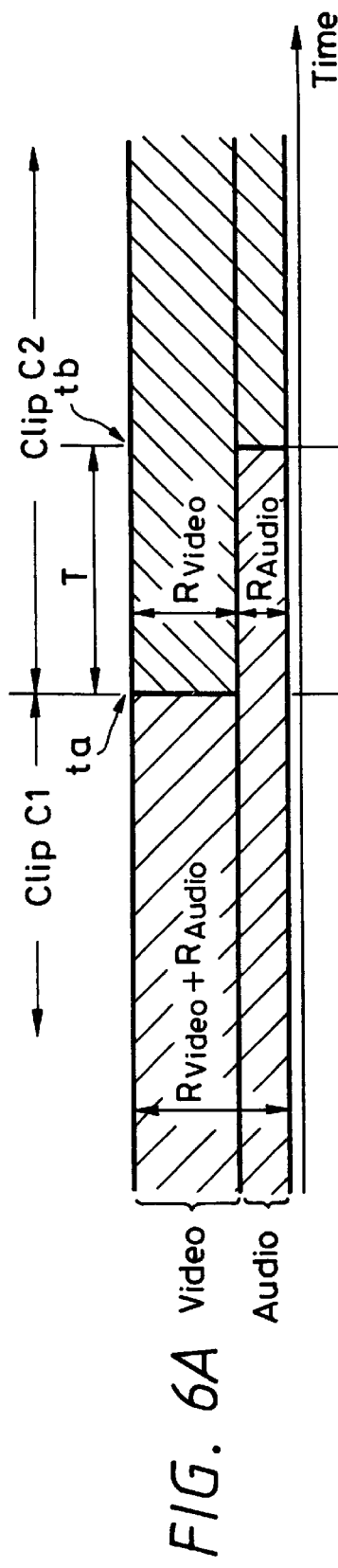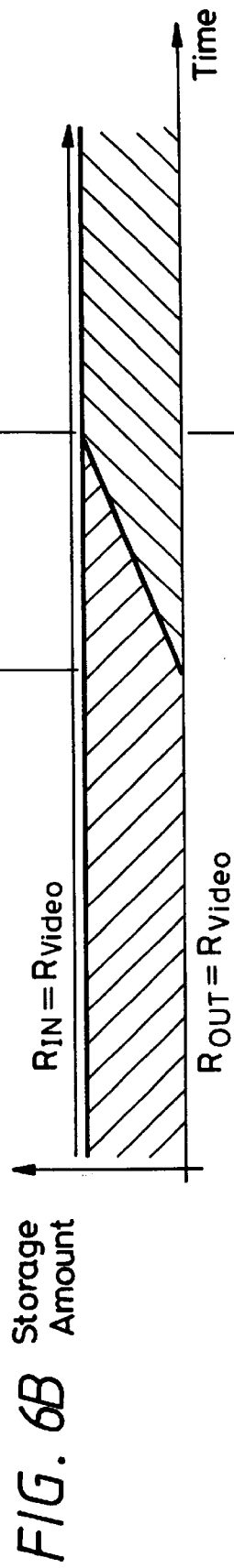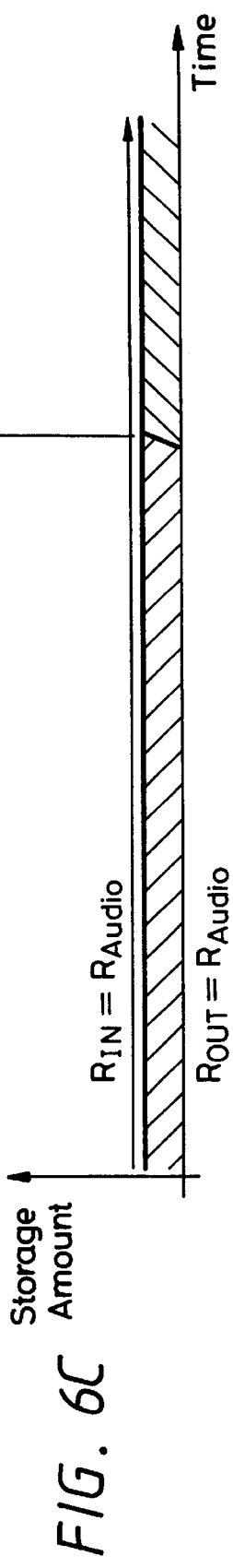

FIG. 9

Case of Compressed Audio

| $R_{Video}+R_{Audio}$(Mbps) | $R_{Audio}$(kbps) | $EO_{Audio}$(Mbit) |
|---|---|---|
| 5 | 384 | 0.355 |
|   | 448 | 0.408 |
| 10 | 384 | 0.369 |
|    | 448 | 0.428 |
| 15 | 384 | 0.374 |
|    | 448 | 0.435 |

Case of PCM

| $R_{Video}+R_{Audio}$(Mbps) | $R_{Audio}$(kbps) | $EO_{Audio}$(Mbit) |
|---|---|---|
| 5 | 768 | 0.650 |
|   | 1536 | 1.064 |
| 10 | 768 | 0.709 |
|    | 1536 | 1.300 |
| 15 | 768 | 0.729 |
|    | 1536 | 1.379 |

VIDEO/AUDIO DECODING APPARATUS AND METHOD

BACKGROUND OF THE INVENTION

1. Field of the Invention

The present invention relates to a system target decoder, and in particular to a capacity of an audio buffer used in a decoder for reproducing a stream obtained by conducting multiplexing so that an audio skew generated in a stream connection portion will not be separated from a video stream corresponding thereto.

2. Description of the Related Art

In the MPEG2 system standards, a STD (system target decoder) is defined for each of PS (program stream) and TS (transport stream) as a virtual decoder model, in order to separate individual elementary streams (video streams and audio streams) from packet multiplexed streams, and decoding, synchronizing, and displaying them.

In the MPEG2 system standards, however, there are no stipulations concerning a method for connecting a plurality of independent streams and reproducing them seamlessly.

In Part 3: DVD-Video standards included in standards concerning a DVD (digital versatile disk), therefore, an E-STD (extended system target decoder) is defined as an extended decoder model in order to allow a user to conduct seamlessly manipulations such as directors cut and multi-angle.

A stream for seamless reproduction is divided into units called interleave units, and disposed in a recording area called an interleave block. At the time of reproduction, among the interleave units, interleave units which are not specified by the user are jumped. Only the interleave units specified by the user are read out, and continuously inputted to the E-STD.

This E-STD is premised on a recording system in which an audio skew generated in a connection portion of the sream is separated from a video stream (to be subjected to synchronous reproduction) corresponding to it, and multiplexed. It is now assumed that as streams following a certain stream SI three interleave units, angle 1, angle 2 and angle 3 are prepared because of a multi-angle configuration as shown in FIG. 1. In this case, audio skews generated in connection portions between the stream S1 and the angles 1, 2 and 3 are separated from a video stream included in the stream Si, and multiplexed to the angles 1, 2 and 3.

In such a recording system, however, there occurs a problem that data differing in reference time for decoding and display are mixedly present in the angle 1, angle 2 and angle 3 shown in FIG. 1 and consequently the logical structure thereof becomes indefinite.

Furthermore, in locations differing from a stream boundary, the stream is cut off. A cluster of data obtained by the cut off (such as the stream S1, and angles 1, 2 and 3 shown in FIG. 1) is herein referred to as "clip". As shown in FIG. 2, boundaries between clips do not coincide with boundaries between streams. This results in a problem that the meaning of boundaries becomes indefinite. Especially in the case where individual clips are managed as files by a personal computer or the like, an audio skew and a video stream corresponding to it are contained in separate files, resulting in a hindrance to file management.

On the other hand, by adopting such a recording system that audio skews generated in connection portions of a stream are multiplexed so as not to make them separate from a video stream corresponding thereto, the above described problems can be avoided.

As the system target decoder for conducting seamless reproduction of a stream in such a recording system, however, it becomes necessary to increase the capacity of an audio buffer included in hardware resources of the P-STD defined by the MPEG2 system standards. Or while maintaining the hardware resources intact, it becomes necessary to conduct software processing for temporally changing an area of a single buffer assigned as a video buffer and an area of the single buffer assigned as an audio buffer. The reason will be described later.

SUMMARY OF THE INVENTION

In the system target decoder increased in audio buffer capacity, an object of the present invention is to stipulate the capacity of the audio buffer to be increased.

In an audio buffer used in a decoder for reproducing a stream obtained by conducting multiplexing so that an audio skew generated in a stream connection portion will not be separated from a video stream corresponding thereto, the capacity of the audio buffer is increased, in the present invention, according to an increase value of the data storage amount in an interval during which an audio stream is inputted to this audio buffer, but a video stream is not inputted to a video buffer of this system target decoder.

According to the present invention, the capacity of the audio buffer is increased by the above described amount. As a result, a system target decoder system for conducting seamless reproduction of a stream obtained by conducting multiplexing so that an audio skew generated in a stream connection portion will not be separated from a video stream corresponding thereto can conduct reproduction without causing overflow from the audio buffer.

BRIEF DESCRIPTION OF THE DRAWINGS

FIG. 6 is a time chart showing relations on time axis between a video stream and an audio stream in the case of E-STD;

FIG. 9 is a diagram showing concrete examples of a capacity increase value of an audio buffer of FIG. 5.

DETAILED DESCRIPTION OF THE PREFERRED EMBODIMENT

First of all, a recording system on which the present invention is premised will be described.

In this recording system, a last packet of an audio stream included in a former clip (hereafter referred to as clip C1) of two clips which should be subjected to seamless reproduction contains a sample of a display time which coincides with an end time of picture display displayed in the end of a video stream included in the clip C1. And a first packet of an audio stream included in a latter clip (hereafter referred to as clip C2) of the two clips contains a sample of a display time which coincides with a start time of picture display displayed in the head of a video stream included in the clip C2. Thereby, multiplexing is conducted so that an audio skew generated in a stream connection portion will not be separated from a video stream corresponding thereto.

Figure 1:
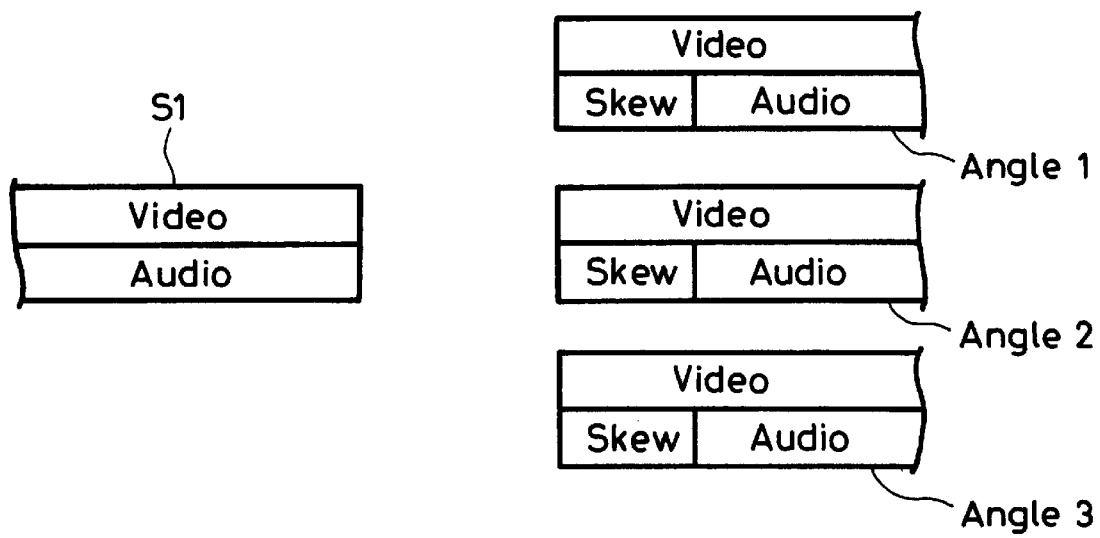
FIG. 1 is a diagram showing streams.
Figure 3:
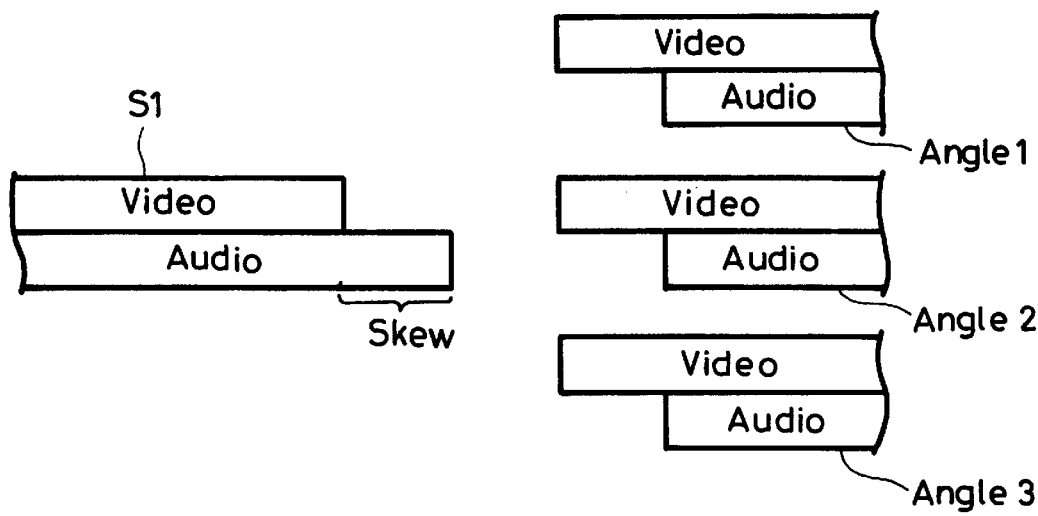
FIG. 3 is a diagram for description of a clean break.

This recording system (hereafter referred to as "clean break") is shown in FIG. 3 so as to be compared with FIG. 1 of the recording system described earlier.

In this clean break, only data which are common in reference time for decoding and displaying are present in one clip. Therefore, its logical structure becomes definite.

Figure 4:
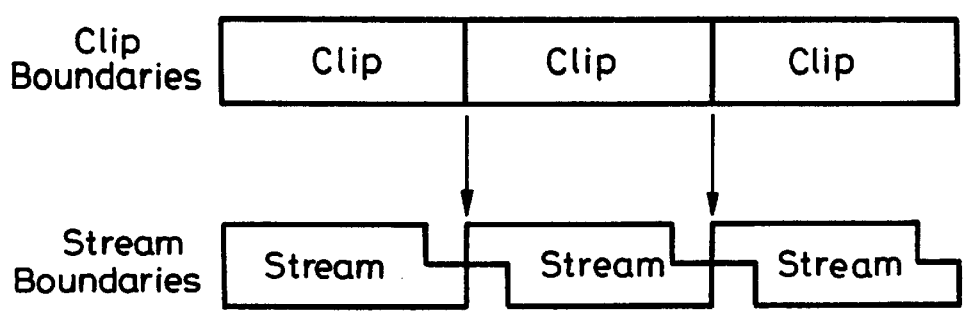
FIG. 4 is a diagram showing clip boundaries and stream boundaries in the clean break.

Furthermore, clips are obtained by cutting off a stream at its boundaries. As shown in FIG. 4 as well, clip boundaries coincide with stream boundaries. The meaning of boundaries thus becomes definite. Also in the case where clips are managed as files, an audio skew and a video stream corresponding thereto are contained in the same file.

A configuration example of a system target decoder according to the present invention will now be described by referring to FIG. 5.

This system target decoder is a system target decoder for a digital video recorder. It is hereafter referred to as a "DVR-STD".

A packet multiplexed stream (a stream using the above described clean break) is read out from a recording medium, which is not illustrated, and inputted to the DVR-STD. The packet multiplexed stream is separated into elementary streams, i.e., a video stream, an audio stream, and a sub-picture stream (such as graphic data or the like) by a demultiplexer 1. The video stream, the audio stream, and the sub-picture stream are stored in a video buffer 2, an audio buffer 3, and a graphic buffer 4, respectively.

Upon arrival of decoding time indicated by a DTS (decode time stamp), I pictures and P pictures contained in the video stream are transferred from the video buffer 2 to a video decoder 5, decoded therein, and stored in a rearrangement buffer 6.

Thereafter, upon arrival of display time indicated by a PTS (presentation time stamp), B pictures of the video stream, an audio stream, and a sub-picture stream are transferred from the video buffer 2, the audio buffer 3, and the graphic buffer 4 to the video decoder 5, an audio decoder 7, and a graphic decoder 8, respectively, and then decoded and displayed. Thereafter, the I pictures and the P pictures stored in the rearrangement buffer 6 are displayed successively in accordance with the PTS.

In an STC generation unit 9, an STC (system time clock) serving as reference time is generated on the basis of an SCR (system clock reference) contained in the input stream.

In an STC_delta calculation unit 10, there is calculated an STC_delta which is a difference in time reference between a clip C1 and a clip C2 according to the following equation. The clip C1 is a former one of two clips to be reproduced seamlessly. The clip C2 is a latter one of the two clips to be reproduced seamlessly. In the equation, PTS1end is a value of a PTS of a last frame in a video stream contained in the clip C1. PTS2start is a value of a PTS of a first frame in a video stream contained in the clip C2. Tpp is a display interval of the last frame in the video stream contained in the clip C1.

STC_delta=PTS1end−PTS2start+Tpp

In an adder 11, the STC generated in the STC generation unit 9 and the STC_delta generated in the STC_delta calculation unit 10 are added. A resultant STC' is outputted from the adder 11.

When one clip is reproduced, the DVR-STD functions entirely in the same way as the P-STD by using the STC, which has been set aright by the SCR contained in that clip, as reference time.

When the two clips are connected and reproduced seamlessly, however, the reference time is switched between the STC and the STC' by using illustrated switches SW1, SW2 and SW3 or the like in an interval of transition from the clip C1 to the clip C2, in order to continuously display the video data of the clip C1 and the video data of the clip C2.

For example, input timing of the packet multiplexed stream to the video decoder 5 is determined as follows:

(a) Since the clip C1 has been inputted until time when the clip C2 inputting is started, the input timing is determined by the reference time STC set aright by the SCR contained in the clip C1.

(b) Since the time when the clip C2 inputting is started until time when the last video data in the clip C1 has been finished in displaying (i.e., in an interval of the transition from the clip C1 to the clip C2), the reference time is switched over to the STC' and the STC is set aright by the SCR contained in the clip C2.

(c) Upon arrival of the time when the last video data in the clip C1 has been finished in displaying, the STC is reset to the STC' at that time and the reference time is switched over to the STC.

The capacity of the audio buffer 3 which is a feature of the present invention will now be described while comparing this DVR-STD with the E-STD described earlier.

Figure 2:
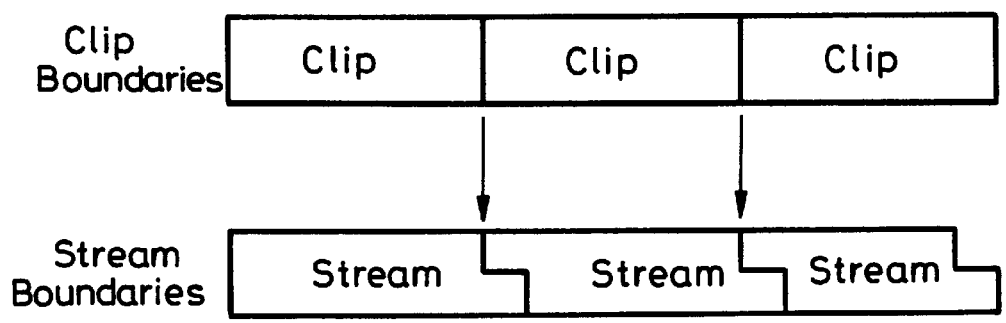
FIG. 2 is a diagram showing clip boundaries and stream boundaries.

In the case of the E-STD, clip boundaries do not coincide with stream boundaries, as shown in FIG. 2 as well. In a process of sending video streams and audio streams separated from the former clip C1 and the latter clip C2 to the video buffer and the audio buffer, respectively, therefore, relations on the time axis between the video streams and the audio streams become as exemplified in FIG. 6A.

In FIG. 6A, a time ta is a boundary between the clip C1 and the clip C2. In addition, the time ta is also a boundary between two video streams. A time tb is a boundary between two audio streams. Video data at the time ta in the video stream and audio data at the time tb in the audio stream are related to be reproduced in synchronism. A portion of the audio stream sent in an interval T ranging from the time ta to the time tb is an audio skew. By the way, $R_{Video}$ and $R_{Audio}$ are readout rates of the video stream and the audio stream from a recording medium, respectively. It is now assumed the readout rates are fixed rates for the purpose of description.

FIG. 6B exemplifies the state of the video buffer in this process. In this example, both an input rate $R_{IN}$ of data to the video buffer and an output rate $R_{OUT}$ of data from the video buffer coincide with the $R_{Video}$. Therefore, the amount of data stored in the video buffer is fixed. Furthermore, the video data at the time ta is stored in the video buffer during the interval T so as to be reproduced in synchronism with the audio data at the time tb. (Since the MPEG2 system standards inhibit the same data from being stored in a buffer of the P-STD for more than 1 second, the length of the interval T is 1 second in upper limit.)

FIG. 6C exemplifies the state of the audio buffer in this process. In this example, both an input rate $R_{IN}$ of data to the audio buffer and an output rate $R_{OUT}$ of data from the audio buffer coincide with the $R_{Audio}$. Therefore, the amount of data stored in the audio buffer is fixed.

Figure 5:
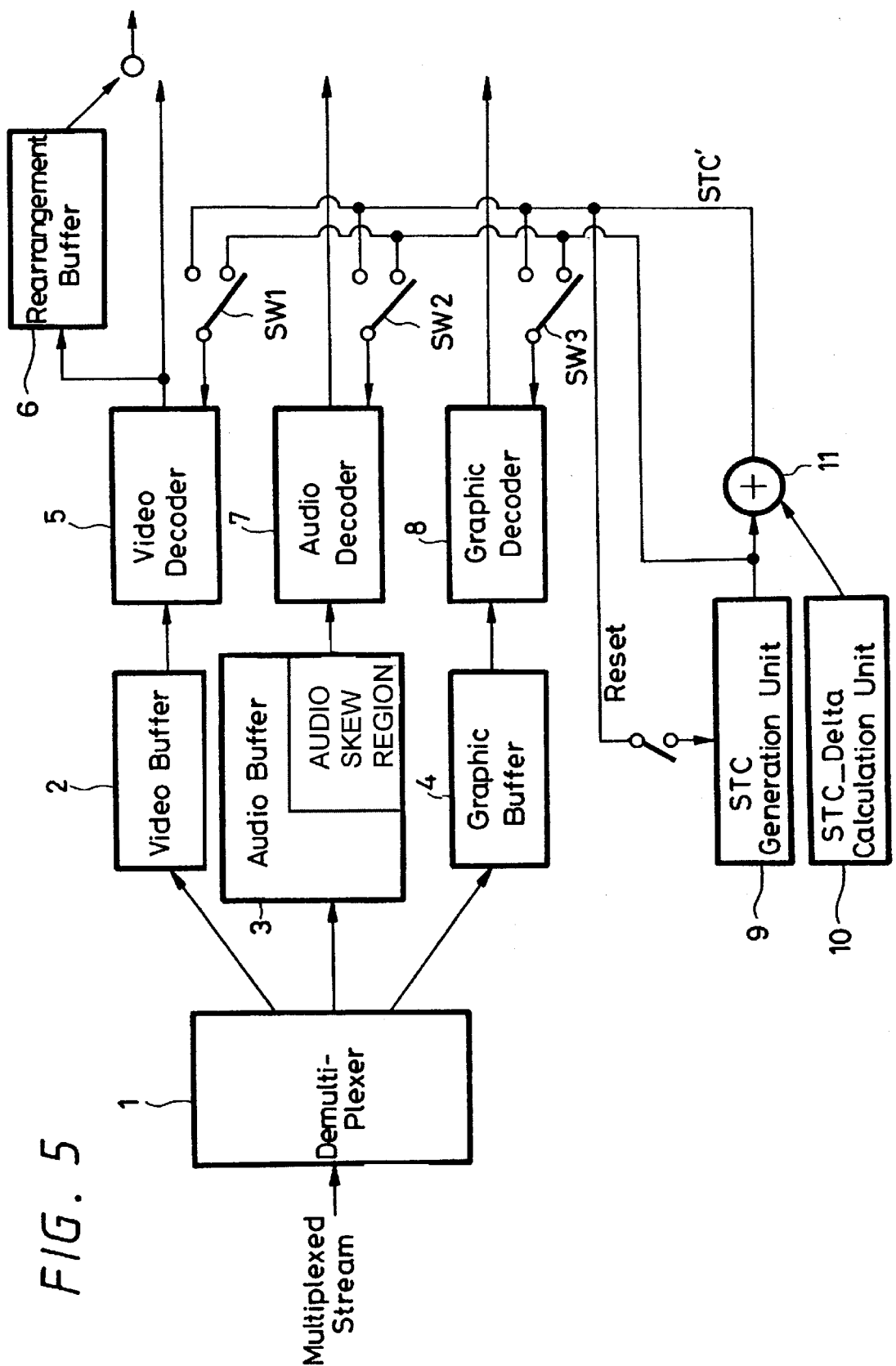
FIG. 5 is a block diagram showing a configuration example of a system target decoder according to the present invention.

On the other hand, in the case of the DVR-STD shown in FIG. 5, clip boundaries coincide with stream boundaries as shown in FIG. 3 as well. In a process of sending video streams and audio streams separated from the former clip C1 and the latter clip C2 to the video buffer 2 and the audio buffer 3, respectively, therefore, relations on the time axis between the video streams and the audio streams become as shown in A of FIG. 7A in connection with FIG. 6A.

In this case, relations between the video stream and the audio stream until the time ta become the same as those in the case of the E-STD. Since the time ta, however, a remaining audio stream in the clip C1 (which is a portion corresponding to the audio skew in the interval T of FIG. 6A, and which is a portion projecting from the right end of the clip in FIG. 3) is sent to the audio buffer 3 of FIG. 5 at a rate of $RVideo + R_{Audio}$, and a video stream is not sent to the video buffer 2. And a time tc when transmission of that audio stream has been completed becomes the boundary between the clip C1 and the clip C2.

Since the time tc until the time tb, the video stream in the clip C2 (a portion projecting from the left end of the clip in FIG. 3) is sent to the video buffer 2 of FIG. 5 at a rate of $R_{Video} + R_{Audio}$, and an audio stream is not sent to the audio buffer 3. Since the time tb, relations between the video stream and the audio stream become the same as those in the case of the E-STD.

In the interval T, an interval $T_A$ ranging from the time ta to the time tc and an interval $T_V$ ranging from the time tc to the time tb are represented by the following equations.

$$T_A = T \times R_{Audio} \div (R_{Video} + R_{Audio})$$

$$T_V = T \times R_{Video} \div (R_{Video} + R_{Audio})$$

Figures 7A, 7B, 7C:
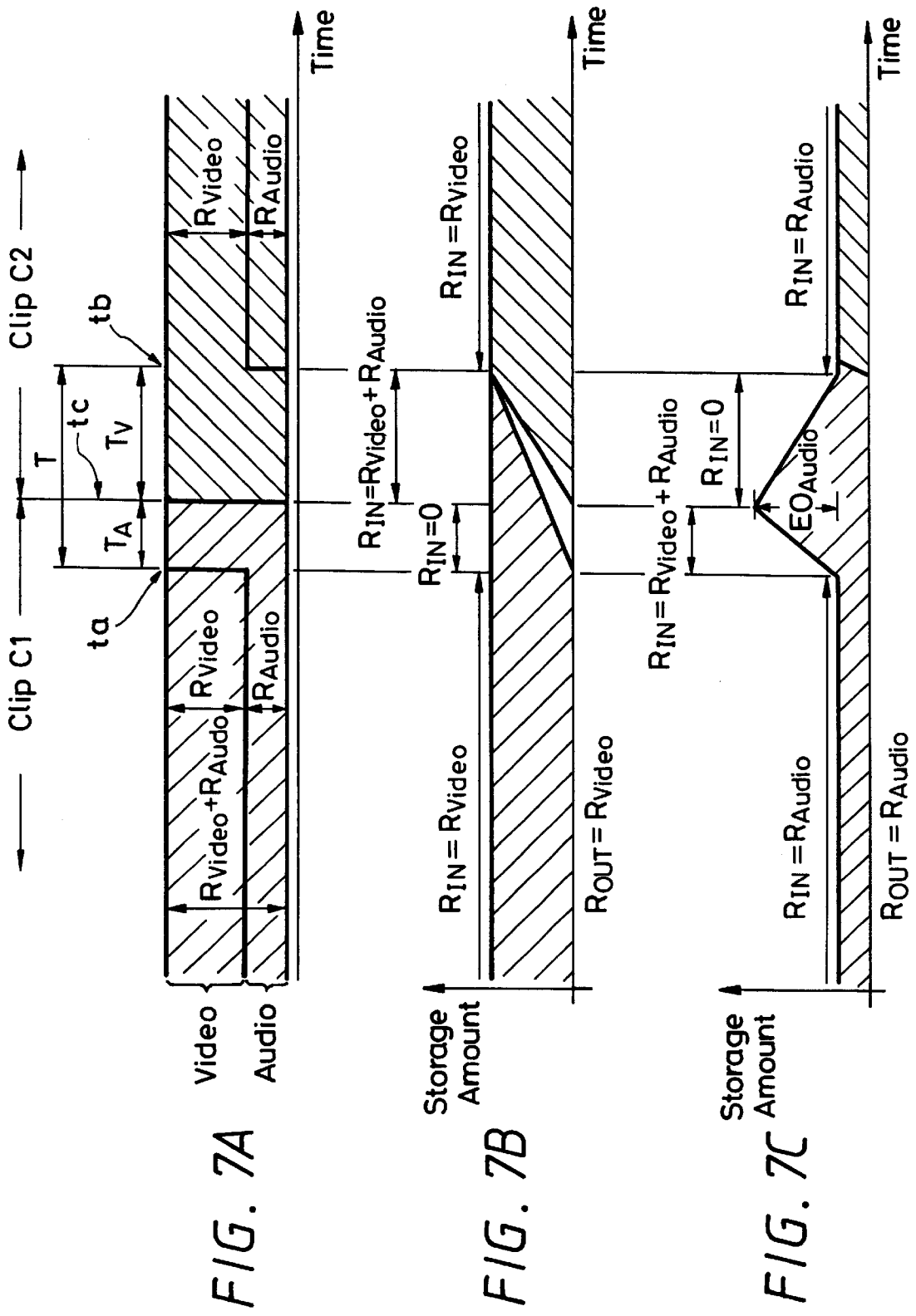
FIG. 7 is a time chart showing relations on time axis between a video stream and an audio stream in the case of the system target decoder of FIG. 5.

FIG. 7B shows the state of the video buffer 2 in this process in connection with FIG. 6B. In the interval $T_A$ ranging from the time ta to the time tc, there are no input data, and consequently the amount of stored data decreases. Since data required in the interval T ranging from the time ta to the time tb have been already inputted until the time ta, however, underflow does not occur in the video buffer 2 during this interval T. In the interval $T_V$ ranging from the time tc to the time tb, data is inputted at an input rate $R_{IN} = R_{Video} + R_{Audio}$ greater than an output rate $R_{OUT} = R_{Video}$, At the time tb, therefore, the amount of stored data has increased to the same value as that in the case of the E-STD.

FIG. 7C shows the state of the audio buffer 3 in this process in connection with FIG. 6C. In the interval $T_A$ ranging from the time ta to the time tc, data is inputted at an input rate $R_{IN} = R_{Video} + R_{Audio}$ greater than an output rate $R_{OUT} = R_{Audio}$, and consequently the amount of stored data increases as compared with the case of the E-STD. In the interval $T_V$ ranging from the time tc to the time tb, there are no input data, and consequently the amount of stored data has decreased to the same value as that in the case of the E-STD at the time tb.

Therefore, the required capacity of the video buffer 2 is equal to that in the case of the E-STD. However, the capacity of the audio buffer 3 must be increased as compared with the case of the E-STD in order to prevent overflow. A minimum value of the amount to be increased is a difference $EO_{Audio}$ between a data storage amount at the time tc of FIG. 7C which is the maximum data storage amount and a data storage amount at the time ta. The magnitude of this difference $EO_{Audio}$ is calculated by the following equation.

$$EO_{Audio} = (R_{IN} - R_{OUT}) \times T_A$$
$$= ((R_{Video} + R_{Audio}) - R_{Audio})$$
$$\times T \times R_{Audio} \div (R_{Audio} + R_{Audio})$$
$$= T \times R_{Video} \times R_{Audio} \div (R_{Video} + R_{Audio})$$

In the DVR-STD of FIG. 5, therefore, a buffer increased in capacity by the $EO_{Audio}$, (a buffer having a capacity of $O_{Audio} + EO_{Audio}$ assuming that the audio buffer shown in FIG. 6C has a capacity of $O_{Audio}$) is used as the audio buffer 3. In this DVR-STD, therefore, seamless reproduction is conducted without causing overflow in the audio buffer 3.

Figure 8:
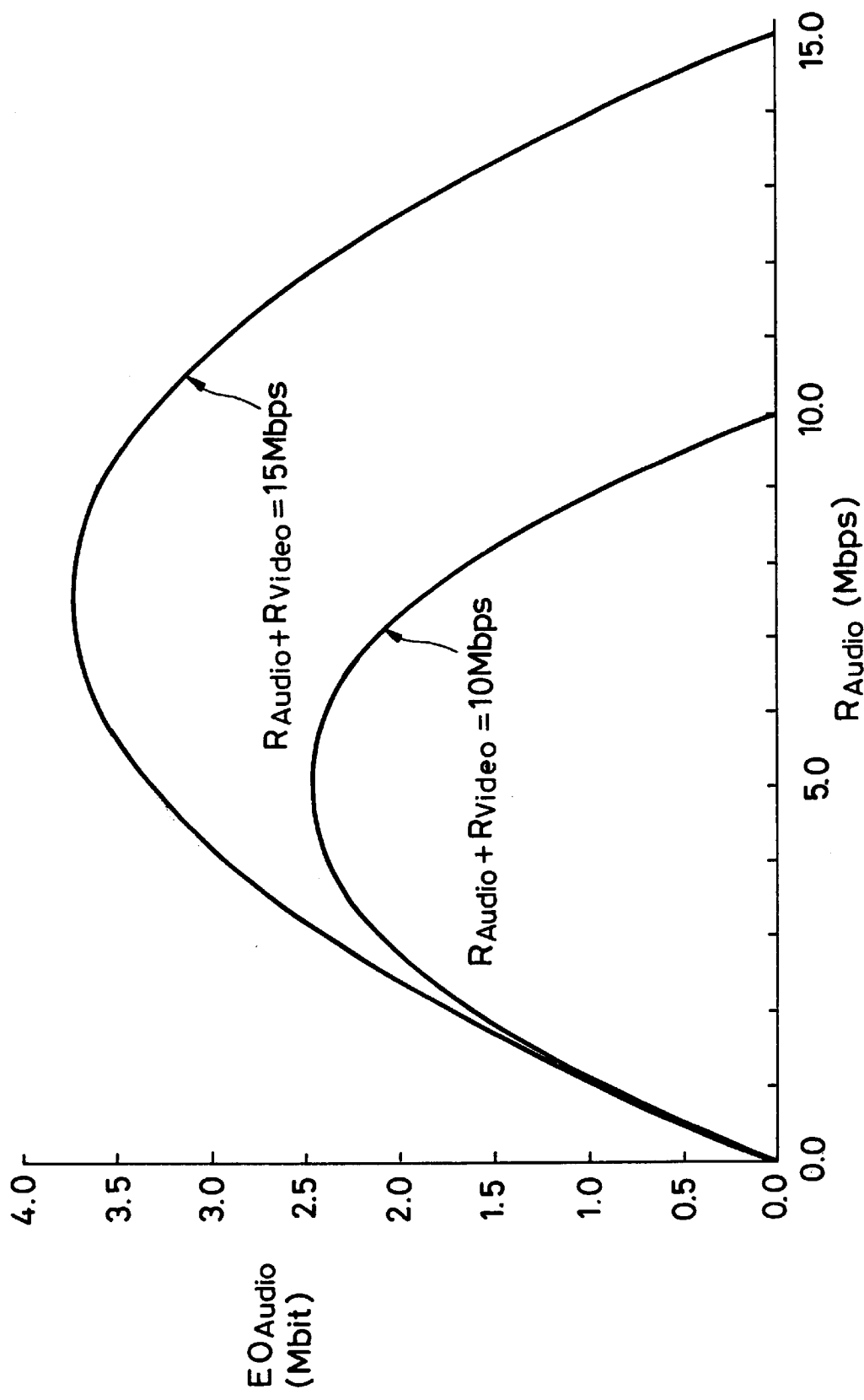
FIG. 8 is a diagram showing relations between a capacity increase value of an audio buffer of FIG. 5 and a read out rate.

FIG. 8 shows relations between the magnitude of the $EO_{Audio}$ and the magnitude of the $R_{Audio}$ obtained when $R_{Video} + R_{Audio} = 10$ Mbps and 15 Mbps, as graphs.

FIG. 9 shows specific examples of preferred magnitudes of the $EO_{Audio}$ when $R_{Video} + R_{Audio} = 5$, 10 and 15 Mbps for the case where the audio stream in the packet multiplexed stream has been obtained by compression using MPEG audio or Dolby AC-3 compressed audio) and the case where the audio stream in the packet multiplexed stream has been obtained by PCM coding.

In FIG. 9, the magnitudes of $R_{Audio}$ 384 kbps and 448 kbps in the case of the compressed audio are maximum bit rates in the MPEG audio and Dolby AC-3, respectively. In the case of PCM, the magnitude of $R_{Audio}$ 768 kbps corresponds to a sampling frequency 32 kHz when the number of quantization bits is 12 and the number of channels is 2 ($32 \times 12 \times 2 = 768$), and 1536 kbps corresponds to a sampling frequency 48 kHz when the number of quantization bits is 16 and the number of channels is 2 ($48 \times 16 \times 2 = 1536$).

In the examples heretofore described, the capacity of the audio buffer 3 has been increased by the minimum value $EO_{Audio}$ required to prevent overflow. As a matter of course, however, the capacity of the audio buffer 3 may be increased by an amount greater than this value $EO_{Audio}$.

In the examples heretofore described, the capacity of the audio buffer 3 has been increased. However, an increase of data storage amount of the audio buffer 3 in the interval ranging from the time ta to the time tb is equal to a decrease of data storage amount of the video buffer 2 in the interval. Therefore, it is also possible to provide a single buffer having a capacity equal to the sum total of capacities of the video buffer and the audio buffer in the case of the E-STD, and conduct software processing for changing a region of the single buffer assigned as the video buffer 2 and a region assigned as the audio buffer 3 in the interval ranging from the time ta to the time tb.

In the examples heretofore described, the present invention can be applied to, for example, a system target decoder for digital video tape recorder. However, the present invention may be applied to other system target decoders (for example, system target decoders for DVD).

The present invention is not limited to examples heretofore described. It is a matter of course that other various configurations can be adopted without departing from the spirit of the present invention.

In a system target decoder for seamlessly reproducing a stream obtained by conducting multiplexing so that an audio skew generated in a stream connection portion will not be separated from a video stream corresponding thereto, the present invention stipulates the capacity of the audio buffer to be increased as heretofore described. As a result, it is possible to cause this system target decoder to conduct seamless reproduction without causing overflow in the audio buffer.

Having described preferred embodiments of the invention with reference to the accompanying drawings, it is to be understood that the invention is not limited to those precise embodiments and that various changes and modifications could be effected therein by one skilled in the art without departing from the spirit or scope of the invention as defined in the appended claims.

What is claimed is:

1. A video/audio data decoding apparatus comprising:

a separation means for separating a multiplexed stream in a stream connection portion, the multiplexed stream being obtained by conducting multiplexing so as not to separate an audio skew from video data corresponding thereto at a connecting position of two data streams reproduced continuously;

a storage means for storing the separated video data and audio data, respectively; and a decoding means for decoding the stored video data and audio data, respectively, wherein the storage means comprises an additional storage region corresponding to the audio skew.

2. A video/audio data decoding apparatus comprising:

a separation means for separating a multiplexed stream in a stream connection portion, the multiplexed stream being obtained by conducting multiplexing so as not to separate an audio skew from video data corresponding thereto;

a storage means for storing the separated video data and audio data, respectively; and a decoding means for decoding the stored video data and audio data, respectively, wherein the storage means comprises an additional storage region corresponding to the audio skew, and wherein the additional storage region has a capacity of at least $$T \times R\text{Video} \times R\text{Audio}/(R\text{Video}+R\text{Audio})$$

where T is a sum of an interval during which only audio data is stored in the storage means and an interval during which only video data is stored in the storage means, RVideo is an input rate of video data, and RAudio is an input rate of audio data.

3. A video/audio data decoding apparatus according to claim 2, wherein the storage means comprises a video data storage means and an audio data storage means, and the audio data storage means comprises the additional storage region.

4. A video/audio data decoding apparatus according to claim 2, wherein the storage means comprises a video data storage region and an audio data storage region, and there is provided a means for exercising control so as to make the audio data storage region include the additional storage region.

5. A video/audio data decoding method comprising the steps of:

separating a multiplexed stream obtained by conducting multiplexing so as not to separate an audio skew from video data corresponding thereto at a connecting position of two data streams reproduced continuously;

storing the separated video data and audio data, respectively; and decoding the stored video data and audio data, respectively, wherein the storing step comprises a step of storing data corresponding to the audio skew.

6. A video/audio data decoding method comprising the steps of:

separating a multiplexed stream obtained by conducting multiplexing so as not to separate an audio skew from video data corresponding thereto;

storing the separated video data and audio data, respectively; and decoding the stored video data and audio data, respectively, wherein the storing step comprises a step of storing data corresponding to the audio skew, and wherein the step of storing data corresponding to the audio skew comprises the step of storing audio data of a capacity of at least $$T \times R\text{Video} \times R\text{Audio}/(R\text{Video}+R\text{Audio})$$

where T is a sum of an interval during which only audio data is stored and an interval during which only video data is stored, RVideo is an input rate of video data, and RAudio is an input rate of audio data.

* * * * *